United States Patent
Ahmari et al.

(10) Patent No.: US 6,188,435 B1
(45) Date of Patent: *Feb. 13, 2001

(54) CIRCUIT FOR CONTROLLING BEAM CURRENT IN A PICTURE TUBE

(75) Inventors: Hossein Ahmari, Villingen-Schwenningen; Gerard Rilly, Unterkirnach, both of (DE)

(73) Assignee: Deutsche Thomson-Brandt GmbH, Villingen-Schwenningen (DE)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/034,698

(22) Filed: Mar. 4, 1998

(30) Foreign Application Priority Data

Mar. 11, 1997 (DE) .............................. 197 09 681

(51) Int. Cl.$^7$ ..................................................... H04N 5/68
(52) U.S. Cl. ............................................ 348/380; 348/377
(58) Field of Search ................................... 348/184, 189, 348/807, 811, 377–382, 644, 645, 648, 805, 177

(56) References Cited

U.S. PATENT DOCUMENTS

| | | | |
|---|---|---|---|
| 4,370,674 | 1/1983 | Johnson et al. . | |
| 4,599,642 | * 7/1986 | Willis .................... | 348/379 |
| 4,652,910 | 3/1987 | Nakagaki et al. . | |
| 5,204,748 | 4/1993 | Lagoni .................... | 358/169 |
| 5,313,294 | * 5/1994 | Haferl .................... | 348/377 |
| 5,430,596 | * 7/1995 | Hamaguchi et al. ........ | 361/86 |
| 5,493,336 | * 2/1996 | Racek et al. ............. | 348/378 |
| 5,504,538 | 4/1996 | Tsujihara et al. ......... | 348/673 |
| 5,671,016 | * 9/1997 | Suzuki ................... | 348/377 |
| 5,835,161 | * 11/1998 | Keller ................... | 348/674 |
| 5,889,557 | * 3/1999 | Sato ..................... | 348/380 |

FOREIGN PATENT DOCUMENTS

| | | | |
|---|---|---|---|
| 3419282C2 | 5/1984 | (DE) | H04N/3/20 |
| 3508168C2 | 3/1985 | (DE) | H04N/5/16 |
| 3514998A1 | 4/1985 | (DE) | H04N/5/59 |
| 3516602C2 | 5/1985 | (DE) | H04N/5/63 |
| 68910948T2 | 12/1989 | (DE) | H04N/5/57 |
| 0149334 | 7/1985 | (EP) | H04N/5/68 |
| 0154527A2 | 9/1985 | (EP) | H04N/9/72 |
| 0393946 | 10/1990 | (EP) | H04N/5/59 |
| 0393946A2 | 10/1990 | (EP) | H04N/5/59 |
| 8413090 | 8/1984 | (FR) | H04N/6/69 |

OTHER PUBLICATIONS

Douziech P. et al. :"A large–bandwidth videoprocessor for high definition and double–scan TV sets" IEEE Transactions on Consumer Electronics, vol. 37, No.4, Nov. 1, 1991, pp. 928–931, XP000276019.

Copy of German Search Report citing the above–listed documents AM, AN, AO, AP, AQ, AR, and AS. English abstracts of German references listed in AM, AN, AP, AQ and AR are also enclosed.

Copy of European Search Report citing the above–listed documents. AA, AB, AS, AT and AW.

Copy of Search Report.

* cited by examiner

Primary Examiner—Victor R. Kostak
(74) Attorney, Agent, or Firm—Joseph S. Tripoli; Paul P. Kiel

(57) ABSTRACT

A circuit for controlling beam current in a picture tube, which circuit calculates current pictures for the R, G, B beam currents in the picture tube, which largely correspond to real beam currents in the color picture tube. The circuit comprises a comparator/integrator which compares a sum of these current pictures with a beam current information item for the purpose of controlling the R, G, B beam currents and/or the picture sharpness. Gamma correction is carried out in the circuit. The circuit may be of analog or digital construction and may advantageously be integrated in a video processor IC. The present circuit is particularly applicable for television sets or computer monitors.

6 Claims, 2 Drawing Sheets

CIRCUIT FOR CONTROLLING BEAM CURRENT IN A PICTURE TUBE

BACKGROUND OF THE INVENTION

The present invention relates to a circuit for controlling the beam current in a colour picture tube which is driven by R, G, B signals. Circuits of this type are generally known since picture tubes have to be protected against overloading by an excessively high beam current.

The sole information item that reveals the magnitude of the beam current is obtained from the high voltage via the associated high-voltage transformer. However, this information item only yields a sum of the R, G, B beam currents and is, moreover, delayed by about two milliseconds, deformed, integrated and limited. Controlling circuits based solely on the information item of the high-voltage transformer therefore effect only coarse regulation that does not refer to the individual R, G, B beam currents in the picture tube.

SUMMARY OF THE INVENTION

The invention is based on the object of specifying an improved circuit for controlling the beam current, which, in particular, also provides a fast regulation information item.

This object is achieved by means of the present invention as specified below.

The circuit for controlling the beam current uses current pictures for the R, G, B beam currents in the colour picture tube, by means of which each individual R, G, B beam current is individually monitored with regard to picture sharpness and/or peak white, maximum beam current and average beam current values per line and also per picture. The current pictures largely correspond to the real currents in the colour picture tube. A sum of these current pictures is compared with a beam current information item which is obtained for example from the associated high-voltage transformer in order to correct fluctuations in the milliseconds range and long-term drifts. By using current pictures, the circuit for controlling the beam currents therefore enables very fast regulation especially for the picture sharpness for the three R, G, B colours, but also for the total beam current in the picture tube.

In order to generate the current pictures, the R, G, B signals are tapped, e.g. clamped, in an amplifier comprising, in particular, a controllable gain, are amplified and then weighted by means of gamma correction. The real current ratios in the picture tube are simulated in the circuit by this means. A weighted sum is formed from these signals and serves as a comparison value with respect to the beam current information item $I_{CRT}$. The two information items are compared with one another in a comparator/integrator and the output signal thereof is used to control the gain of the amplifier.

In a control circuit, the values of each of the individual R, G, B current pictures are monitored in order to regulate the R, G, B beam currents and the picture sharpness. In addition, the weighted sum together with the output signal of the control circuit are monitored in a decision circuit.

The circuit for controlling the beam current can be of completely analogue construction and may advantageously be integrated in an existing video processor. The circuit may alternatively be realized digitally if the video processor operates digitally. The gamma correction can be carried out for example by means of a plurality of operational amplifiers which simulate the non-linear curve in each case for a specific current range. The R, G, B signals are formed from the applied Y, B-Y and R-Y signals in the video processor. The corrections for picture sharpness and maximum beam current are then included in connection with contrast, picture brightness and saturation.

The circuit for controlling the beam current can be used in conjunction with all colour picture tubes which are driven by R, G, B signals and are used e.g. in television sets or computer monitors.

BRIEF DESCRIPTION OF THE DRAWINGS

The invention is explained below by way of example with reference to schematic drawings, in which.

DETAILED DESCRIPTION

Figure 1:
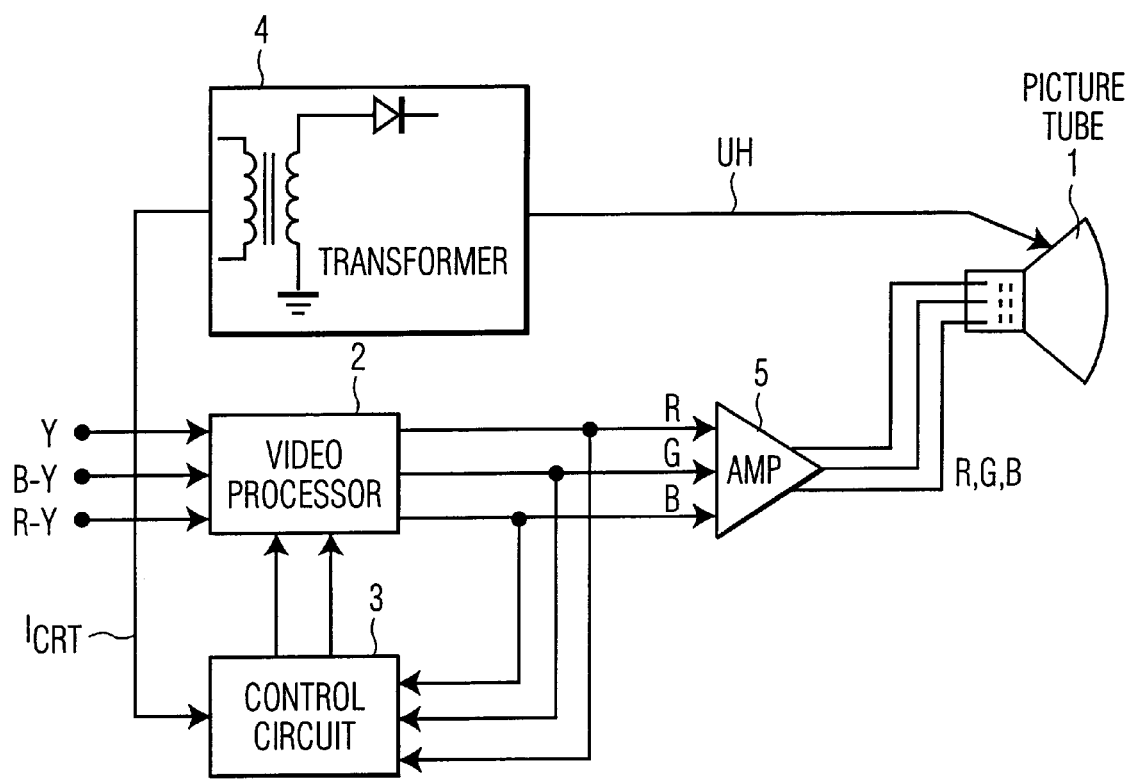
FIG. 1 shows a simplified block diagram of beam current control for an R, G, B colour picture tube.

FIG. 1 illustrates a colour picture tube 1, which is supplied with high voltage UH by a high-voltage transformer 4 and is driven by R, G, B signals via a video processor 2 and a video amplifier 5. A circuit 3 for controlling the beam current receives a beam current information item $I_{CRT}$ from the high-voltage transformer 4 and, via a tap between the video processor 2 and the video amplifier 5, an information item concerning the R, G, B signals. Current pictures which correspond to the real beam current ratios in the picture tube 1 are calculated in the circuit 3. These current pictures enable very fast regulation both for the picture sharpness and for the R, G, B beam currents.

In connection with improving the picture quality e.g. in a television set, the requirements of the picture tube and, in particular, of the beam currents are becoming ever higher. For example, beam currents of 7 milliamperes per electron gun are already being conceived of for the future. However, the average beam current is not permitted to become too high since an excessively high beam current leads to damage in the picture tube during continuous operation. Since, however, the picture brightness usually fluctuates to a great extent during normal television picture reproduction, it is possible, however, to use considerably higher beam currents for a short time. This is particularly important for displaying momentarily occurring white picture locations with good contrast and high brightness (peak white). However, limiting of the average values of the beam currents must take place here, too, since even a momentarily excessively high beam current leads to blooming of the white picture location. The colour edges are frequently increased excessively in television sets in order to enhance the picture sharpness ("peaking"). This excessive increase must therefore be reduced when the beam currents are very high.

The sole information item concerning the beam currents in the picture tube 1 is the beam current information item $I_{CRT}$, which is obtained via the high-voltage transformer 4 that corresponds to a sum of the R, G, B beam currents. However, this information item does not enable fast and precise regulation since it is delayed for about 2 milliseconds and is additionally deformed, integrated and limited. For example, capacitive currents of the high-voltage transformer also have an influence here. The beam current information item $I_{CRT}$ is used in the circuit 3 only to compensate for longer-term fluctuations, for example temperature effects or ageing effects.

The use of the R, G, B current pictures in the circuit 3 thus enables, on the one hand, very fast regulation for the beam current limiting and, on the other hand, the controlling of the peak currents for each of the R, G, B beam currents in the picture tube 1. The picture sharpness at a picture edge is composed of the corresponding video signal plus the so-called "peaking", as already explained above. This sum is limited to a maximum permitted value in the circuit 3. The R, G, B current pictures may, for example, also be checked by means of measurements directly in the picture tube so that the current pictures come as near as possible to the real beam currents. In this case, capacitive currents, primarily at colour edges, should not be taken into account.

Figure 2:
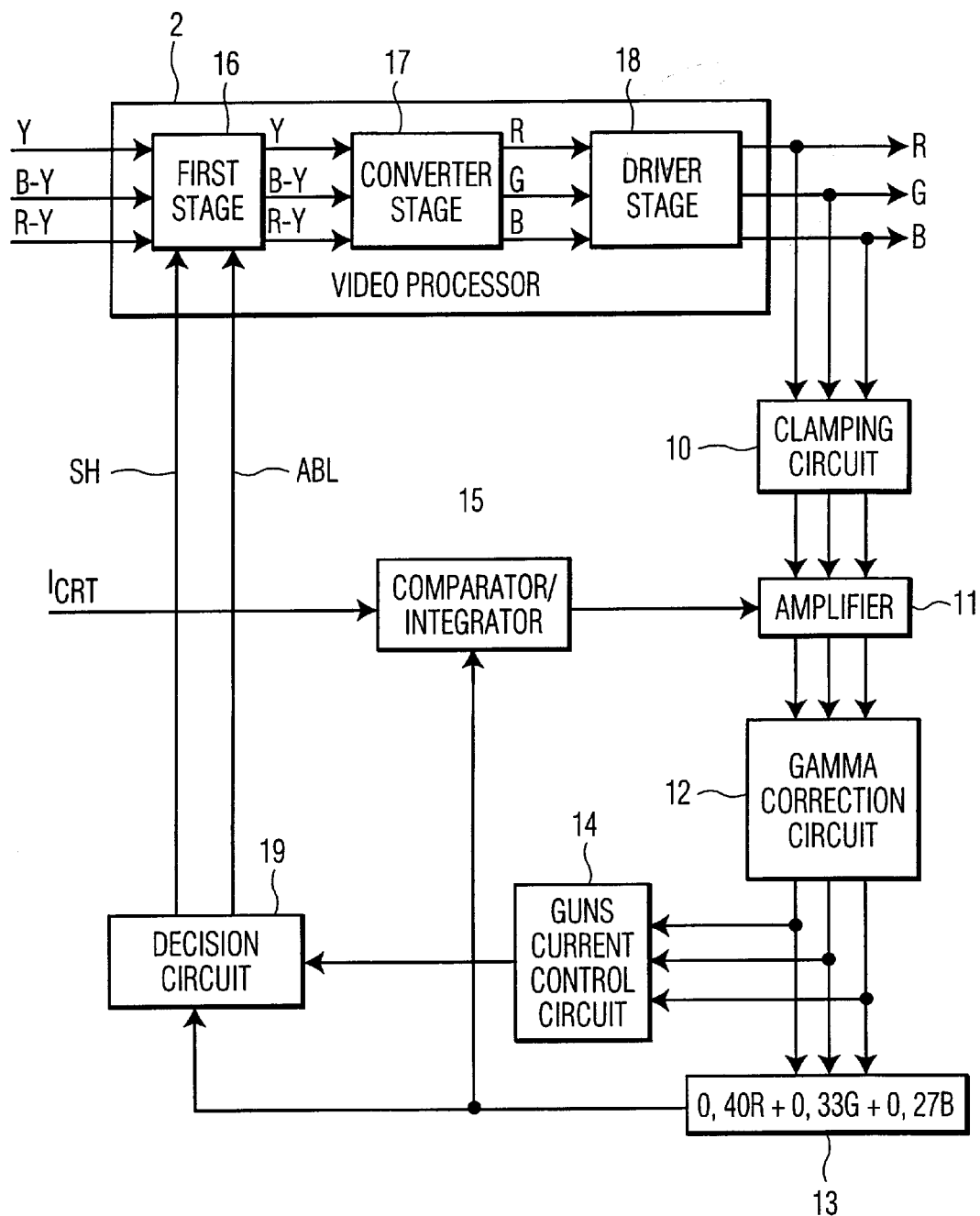
FIG. 2 shows a block diagram of a circuit for controlling the beam current in a colour picture tube.

The circuit 3 is explained in detail below with reference to FIG. 2. Video signals Y, B-Y and R-Y are applied to the already mentioned video processor 2, which forms the R, G, B signals therefrom. Contrast, saturation and brightness are regulated in a first stage 16 of the video processor 2, before these signals are converted into the R, G, B signals (R, G, B matrix) in a following stage 17. The following stage 18 is a driver stage that additionally effects a "cut off". Connected to the R, G, B signals obtained by this means is a clamping circuit whose tapped signals are subsequently amplified in an amplifier 11. In a following circuit 12, gamma correction is performed in order to create the current pictures for the R, G, B beam currents in the picture tube. The gamma correction can be carried out for example by means of three operational amplifiers which simulate the non-linear curve in each case for a specific current range.

The clamping circuit 10 is necessary in this exemplary embodiment since a "cut off" is integrated in the stage 18 of the video processor 2 which is an integrated circuit. Alternatively, the R, G, B signals may also be tapped before the driver stage 18 without a clamping circuit, for example if the circuit 3 is realized together with the video processor 2 in an integrated circuit.

In a guns current control circuit 14, each of the R, G, B current pictures is monitored in order to regulate and/or limit the R, G, B beam currents and the picture sharpness ("peaking"). In a summation circuit 13 a weighted sum is formed from the R, G, B current pictures. This sum corresponds to the current picture for the total current in the picture tube and is done by adding the resulting R, G, B information after the gamma correction circuit and weighting the R, G, B signals by special factors a, b, c which can be for example 0,4, 0,33 and 0,27 for a given colour picture tube as shown in FIG. 2.

In a decision circuit 19, the weighted summation signal and the signal of the control circuit 14 are evaluated together in order to regulate the picture sharpness and the beam currents by means of the video processor 2 by way of a picture sharpness signal SH and a beam current signal ABL (Automatic Beam Limitation). If one of the R, G, B beam currents is too high, then all three R, G, B beam currents are decreased by regulation in order to avoid colour distortions ("peaking control"). The regulation in the control circuit 19 operates very fast (faster than one millisecond) in order to reduce the beam currents in the picture tube, but it operates slowly (approximately in the seconds range) when the beam currents are subsequently elevated again. In this case, the ABL signal controls the total beam current in the picture tube, while the picture sharpness signal SH controls the "peaking" of the R, G, B beam currents.

In a comparator/integrator 15, the beam current information item $I_{CRT}$ is compared with the weighted summation signal of the summation circuit 13. The difference is highly amplified, e.g. by a factor of 30, and greatly integrated (τ of approximately 50 milliseconds), and this signal is used to regulate the gain of the amplifier 11. If the beam current information item $I_{CRT}$ changes, for example on account of voltage changes of the G2 screen grid or of ageing effects, temperature drifts or of a defect, then the amplifier 11 is correspondingly readjusted by the comparator/indicator 15 in order to reset the total current. Thus, the beam current information item $I_{CRT}$ is not used directly for regulation since it is delayed by 2 milliseconds and also contains other disadvantages as already explained above. The delay time of 2 milliseconds can give rise to black/white picture problems, for example, because the beam current is not readjusted fast enough.

For a digital embodiment of a circuit for controlling the beam current an ADC (analog-digital-converter) is required for converting the analog beam current information item. The video signals Y, B-Y, and R-Y are provided in this case as a digital information. In the stage 17 of the video processor these signals are processed and converted to R, G, B signals with for example 8 bit resolution. The clamping circuit 10 of FIG. 2 is no longer necessary in this digital embodiment because the R, G, B data can be provided directly to the amplifier 10 after the processing stage 17. In front of the driver stage 18 a DAC (digital-analog-converter) is arranged for feeding said driver stage 18 with analog signals necessary for driving the picture tube 1. In this embodiment the stages: amplifier 11, gamma correction circuit 12, summation circuit 13, control circuit 14, comparator/integrator 15 and decision circuit 19 are working completely digital. They can use the same resolution 8 bit as the video processor or a higher or lower resolution depending on control requirements.

The above embodiments are only advantageous examples. Modifications are within the skills of a person skilled in the art. Especially the stages 10-19 can be arranged discrete, partly integrated or completely integrated.

What is claimed is:

1. Circuit for controlling beam current in a color picture tube which is driven by R, G, B signals, comprising:

an input connected to a source of R, G, B signals;

an amplifier for amplifying each of the R, G, B signals individually;

means for calculating a separate current picture for each of the R, G, B beam currents by weighting each of the amplified R, G, B signals by means of gamma correction;

a control circuit coupled to the calculating means for monitoring each of the R, G, B, current pictures and regulating picture sharpness in response to the current pictures;

summing means for generating a weighted sum in response to the calculated current pictures;

comparator/integrator for comparing the weighted sum of the current pictures with a beam current information item and controlling gain of the amplifier in response to the comparison.

2. Circuit according to claim 1, further comprising a decision circuit for controlling the R, G, B beam currents or the picture sharpness in response to a signal of the control circuit and the weighted sum.

3. Circuit according to claim 2, wherein the decision circuit influences the Y, B-Y and R-Y signals in a video processor, which is disposed before a tap of the R, G, B signals, with the aim of picture sharpness control and R, G, B beam current control.

4. Method for controlling the beam current in a colour picture tube that is driven by R, G, B signals, comprising the steps of tapping each of the R, G, B signals and separately weighting each of the tapped signals by means of gamma correction for the purpose of calculating a separate current picture for each of the R, G, B beam currents, monitoring each of the separate R, G, B current pictures and controlling picture sharpness in response to the current pictures, forming a weighted sum from the calculated beam pictures, and comparing the weighted sum with a beam current information item in a comparator/integrator and controlling the beam currents in response to the comparison.

5. Method according to claim 4, further comprising the step of evaluating in a decision circuit the monitored R, G, B signals and the sum formed after the gamma correction, the decision circuit influencing the Y, B-Y and R-Y signals in a video processor, which is arranged before the tap of the R, G, B signals, with the aim of picture sharpness control and beam current control.

6. Circuit according to claim 1, wherein the control circuit regulates the R, G, B beam currents in response to the current pictures.

* * * * *